3,563,027
ENERGY TRANSFORMATION DEVICE
Harold B. Greenberger, Cleveland Heights, Ohio, assignor of one-half to Richard R. Walling, Hudson, Ohio
Continuation of application Ser. No. 510,825, Dec. 1, 1965. This application Jan. 15, 1969, Ser. No. 792,230
Int. Cl. F03g 7/06
U.S. Cl. 60—23                                                                                   1 Claim

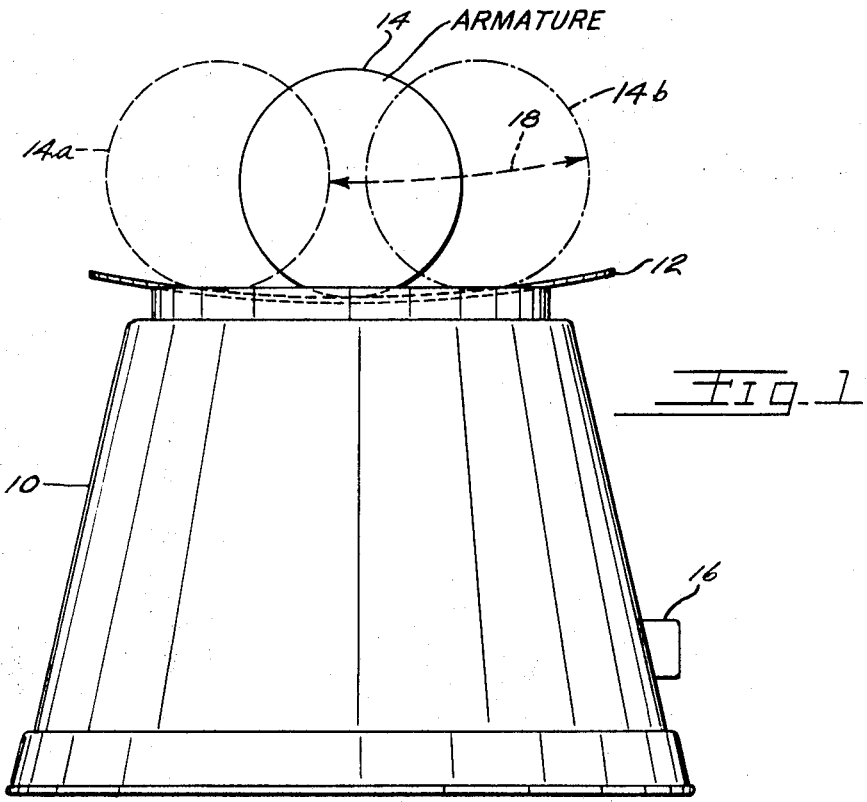
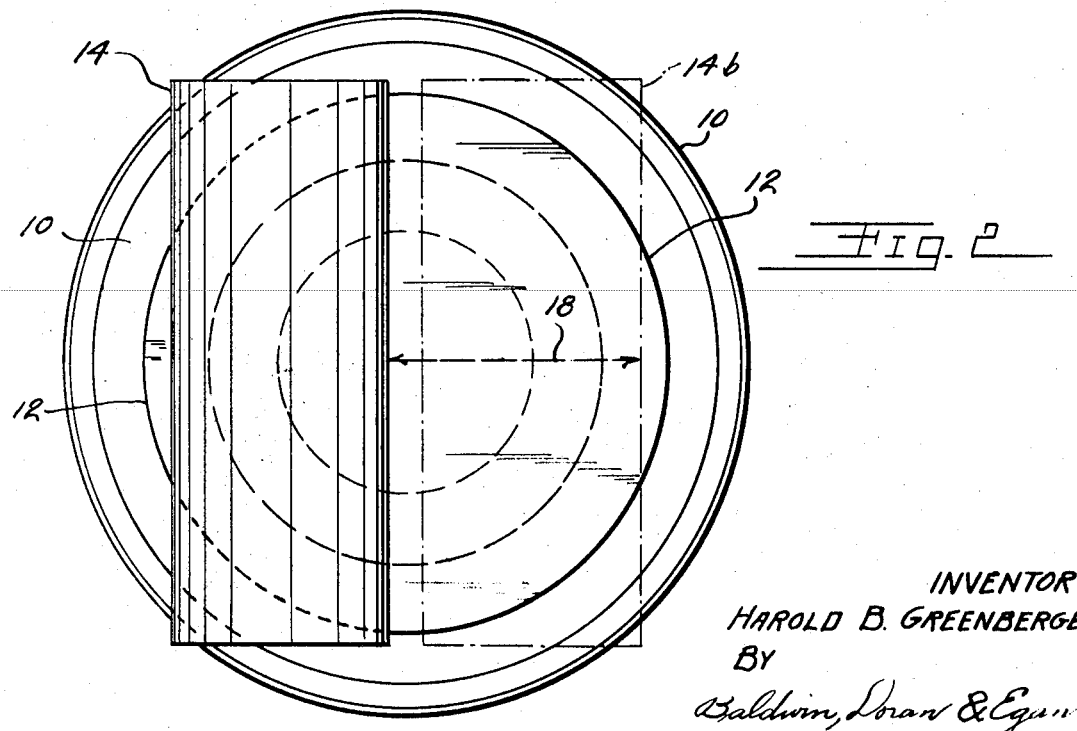
INVENTOR
HAROLD B. GREENBERGER
BY
*Baldwin, Doran & Egan*
ATTORNEYS United States Patent Office 3,563,027
Patented Feb. 16, 1971

ABSTRACT OF THE DISCLOSURE

An energy transformation device for transferring heat energy into kinetic energy. A suitable heat source is provided such as an electric heater, a gas flame, etc., and, in the preferred form of the invention, a heated solder pot is used. Disposed on the top surface of the solder pot is an elongated cylindrical object balanced to roll back and forth on such surface. When the heat is turned on, the cylindrical object will roll back and forth or oscillate on such surface indefinitely. The object may be any suitable elongated cylindrical object such as a solid cylindrical bar, a hollow cylindrical object such as a tin can, and, in the preferred form, a small motor or generator armature is employed.

This application is a continuation of application Ser. No. 510,825, filed Dec. 1, 1965, now abandoned.

This invention relates to energy transformation devices and more particularly to such a device that effects reciprocating kinetic energy.

In prior energy transformation devices, a substantial loss of energy occurs when one type of energy is transformed to another. For example, when heat energy is transformed into electrical energy, a substantial loss of heat occurs. In any such energy transformation, it is imperative to keep the energy loss as low as possible.

Additionally, there has never been a satisfactory means for transforming heat energy and/or magnetic energy directly into kinetic energy.

An object of the present invention is to provide an energy transformation device that produces reciprocating kinetic energy.

A further object of the invention is to provide a device of the above type wherein there is substantially little, if any, energy loss.

Briefly, the foregoing objects are effected by a device comprising a source of heat, a planar surface disposed above the source of heat, and an object balanced on said surface for continuous reciprocation thereon. Any suitable source of heat may be used, such as a heated solder pot. The object may be a motor armature or a hollow cylindrical object such as an empty tin can. When such object is balanced on said surface with the solder pot heated, such object will reciprocate back and forth on said surface indefinitely.

Other objects and advantages of the invention will be apparent from the following description taken in conjunction with the drawings wherein:

FIG. 1 is a front elevational view of an energy transformation device constructed in accordance with the invention;

FIG. 2 is a top view of the device shown in FIG. 1;

Although the invention is shown and described herein with reference to devices for effecting kinetic energy in the form of reciprocating motion, it will be understood that the invention may be used to effect other types of kinetic energy.

Referring to the drawings, there is shown an energy transformation device constructed in accordance with the invention and including a heat source 10, a planar surface 12, and an object 14 balanced on the surface 12 for reciprocation thereon.

In one of the preferred forms of the invention, the heat source 10 is an electrically heated solder pot, although any like suitable heat source may be used. The solder pot shown is provided with the conventional electric receptacle 16 for receiving a suitable source of electrical energy for heating the solder pot in the usual manner. The solder pot may be filled with solder.

The object 14 preferably is an elongated cylindrical object such as a circular bar of metal (14), a tin can or hollow cylindrical object, a motor or generator armature, or like object.

In practice, the heat source 10 is heated to normal operating temperature after which the object 14 is placed on the surface 12 and balanced thereon for to and fro reciprocation. When so placed, the object 14 will effect kinetic energy by continuously locking or reciprocating on the surface 12 from the position 14a to the position 14b for example, the distance of reciprocation being indicated by the arrow 18.

The surface 12 may be slightly concave (downwardly) to effect better balance for reciprocation of the object 14, such concavity being so slight as to be indiscernible in the drawing. The surface 12 may be separable from the solder pot or formed integral therewith. As a modification, the top surface of the heat source may be noticeably concave.

In one form of the invention, reciprocation of the object 14 may be effected by heat alone from the heat source 10. In another form of the invention reciprocation of the object 10 may be effected by heat and magnetism, with the magnetism being inherent in the solder pot or created by electric heating coils therein.

The terms and epressions which have been employed are used as terms of description, and not of limitation and there is no intention, in the use of such terms and expressions, of excluding any equivalents of the features shown or described, or portions thereof, but it is recognized that various modifications are possible within the scope of the invention claimed.

What is claimed is:

1. A device for effecting oscillating kinetic energy comprising, a heat source for emanating heat upwardly, a coacting surface disposed above and spaced from said heat source in the upward path of the heat, and an object balanced on said surface for oscillation thereon, whereby the object oscillates continuously on said surface when the heat source emanates heat, said heat source being a solder pot, said surface being slightly concave, and said object being an armature balanced for oscillation in the concavity of the surface.

References Cited

UNITED STATES PATENTS

| 2,382,928 | 8/1945 | Whitney et al. | 60—23 |
| 2,866,342 | 12/1958 | Moorhead | 60—23X |
| 3,152,554 | 10/1964 | Kofink | 60—23X |
| 3,194,074 | 7/1965 | Anderson et al. | 60—23X |

MARTIN P. SCHWADRON, Primary Examiner
R. R. BUNEVICH, Assistant Examiner